United States Patent [19]
Renkl et al.

[11] Patent Number: 5,139,560
[45] Date of Patent: * Aug. 18, 1992

[54] APPARATUS FOR THE MANUFACTURE OF HOLLOW GLASSWARE

[75] Inventors: Hans-Dieter Renkl, Bühlenhausen; Rudi Waibel, Niederstotzingen, both of Fed. Rep. of Germany

[73] Assignee: Findag Corporation N.V., Curacao, Netherlands Antilles

[*] Notice: The portion of the term of this patent subsequent to Aug. 1, 2006 has been disclaimed.

[21] Appl. No.: 402,704

[22] Filed: Jun. 9, 1989

Related U.S. Application Data

[63] Continuation of Ser. No. 601,631, Apr. 18, 1984, Pat. No. 4,853,022.

[30] Foreign Application Priority Data

Apr. 22, 1983 [DE] Fed. Rep. of Germany ....... 3314584
Apr. 25, 1983 [DE] Fed. Rep. of Germany ....... 3314960

[51] Int. Cl.$^5$ ............................................ C03B 40/027
[52] U.S. Cl. ............................................ 65/170; 65/26; 65/169; 65/181
[58] Field of Search .................... 65/26, 169, 170, 181

[56] References Cited

U.S. PATENT DOCUMENTS

| | | | |
|---|---|---|---|
| 1,756,493 | 4/1930 | Peiler | 65/26 |
| 2,230,609 | 2/1941 | Cannon, Jr. | 239/335 |
| 2,410,422 | 11/1946 | Breene | 65/169 |
| 2,744,358 | 5/1956 | Rowe | 65/243 |
| 2,754,627 | 7/1956 | Denman | 65/170 |
| 3,172,606 | 3/1965 | Reynolds et al. | 239/186 |
| 3,523,016 | 8/1970 | Mattos | 65/170 |
| 3,580,711 | 5/1971 | Hamilton | 65/169 |
| 3,721,542 | 3/1973 | Keller | 65/169 |
| 3,801,299 | 4/1974 | Renkl | 65/169 |
| 3,814,594 | 6/1974 | Mumford | 65/169 |
| 4,391,620 | 7/1983 | Geisel | 65/26 |
| 4,578,099 | 3/1986 | Hubner et al. | 65/26 |

FOREIGN PATENT DOCUMENTS 0043261 1/1982 European Pat. Off. .
1235560 6/1971 United Kingdom .

*Primary Examiner*—Joye L. Woodard
*Attorney, Agent, or Firm*—Akoo-Toren

[57] ABSTRACT

In a device for producing mold glass bodies, a molding cavity is defined by two mold halves and by two mouth ring halves. One single nozzle head is used for spraying a lubricant on both the inner faces of the mold halves and the connection faces of the mouth ring halves which are to contact the mold halves.

24 Claims, 10 Drawing Sheets

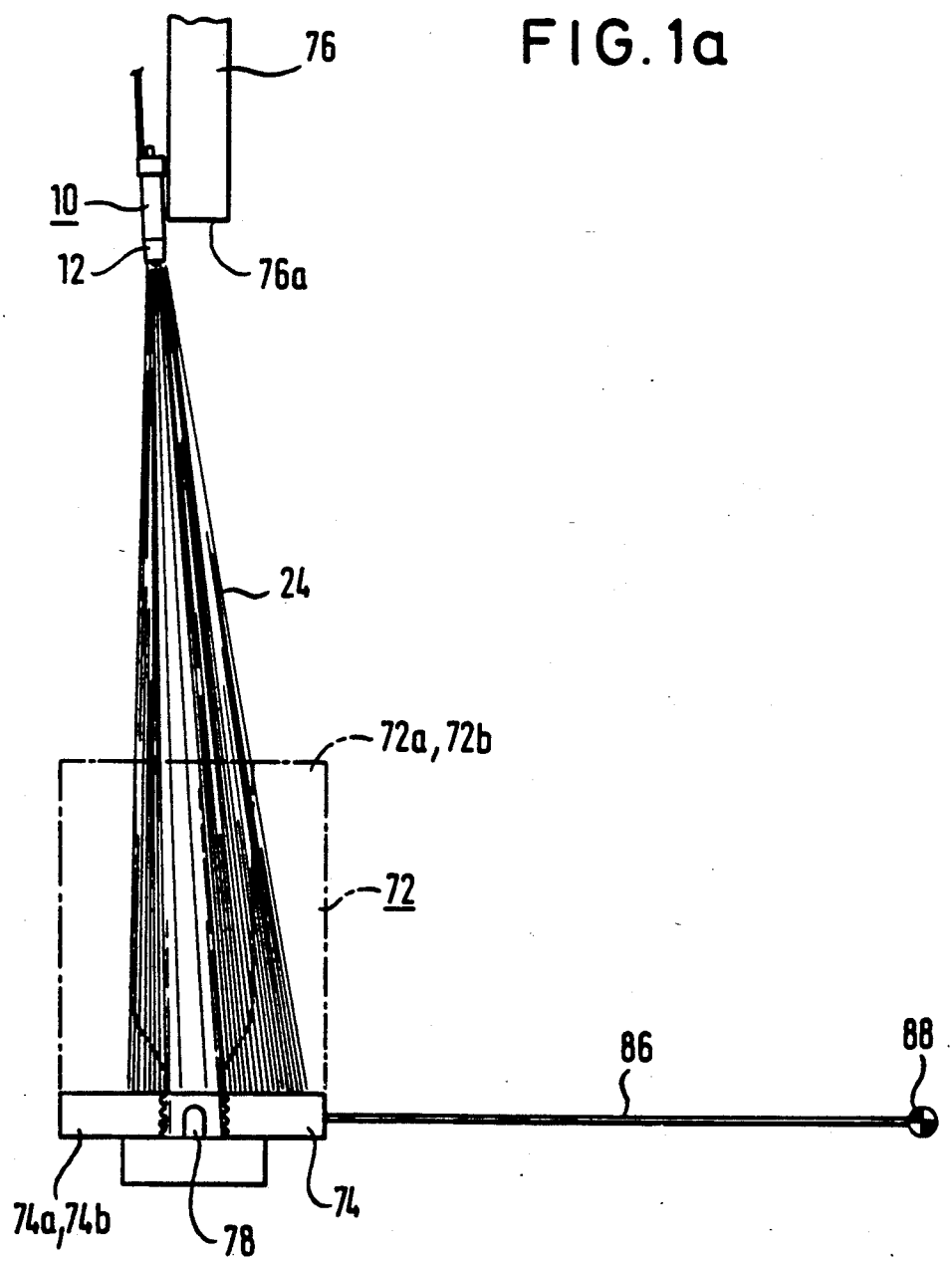

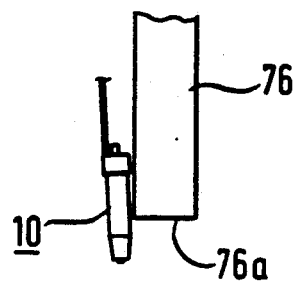
FIG.1e
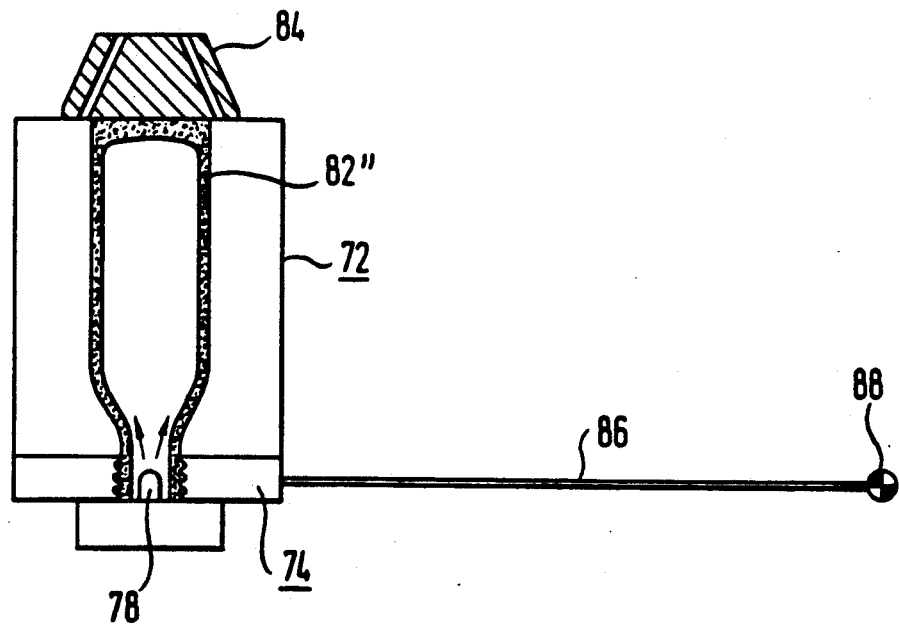

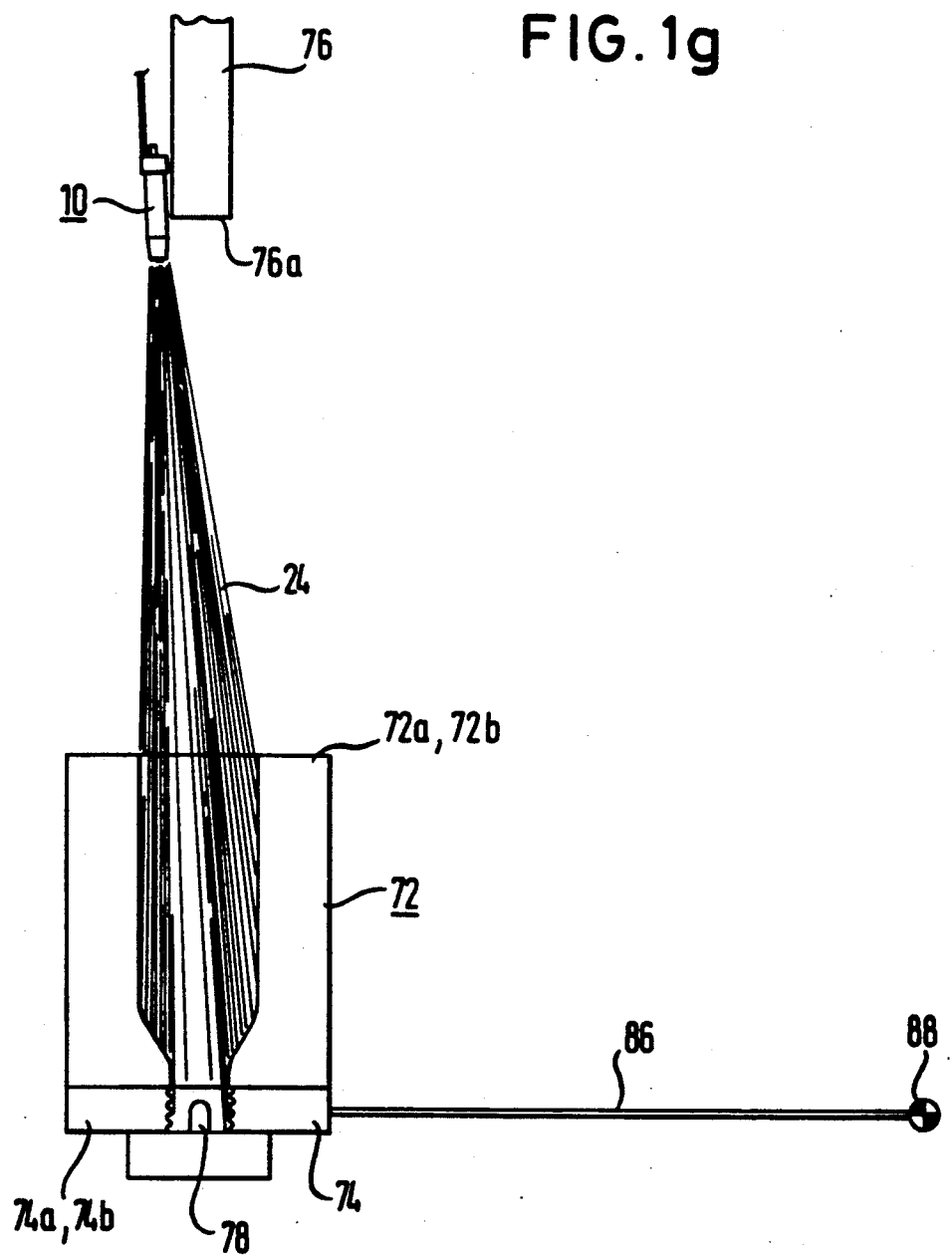

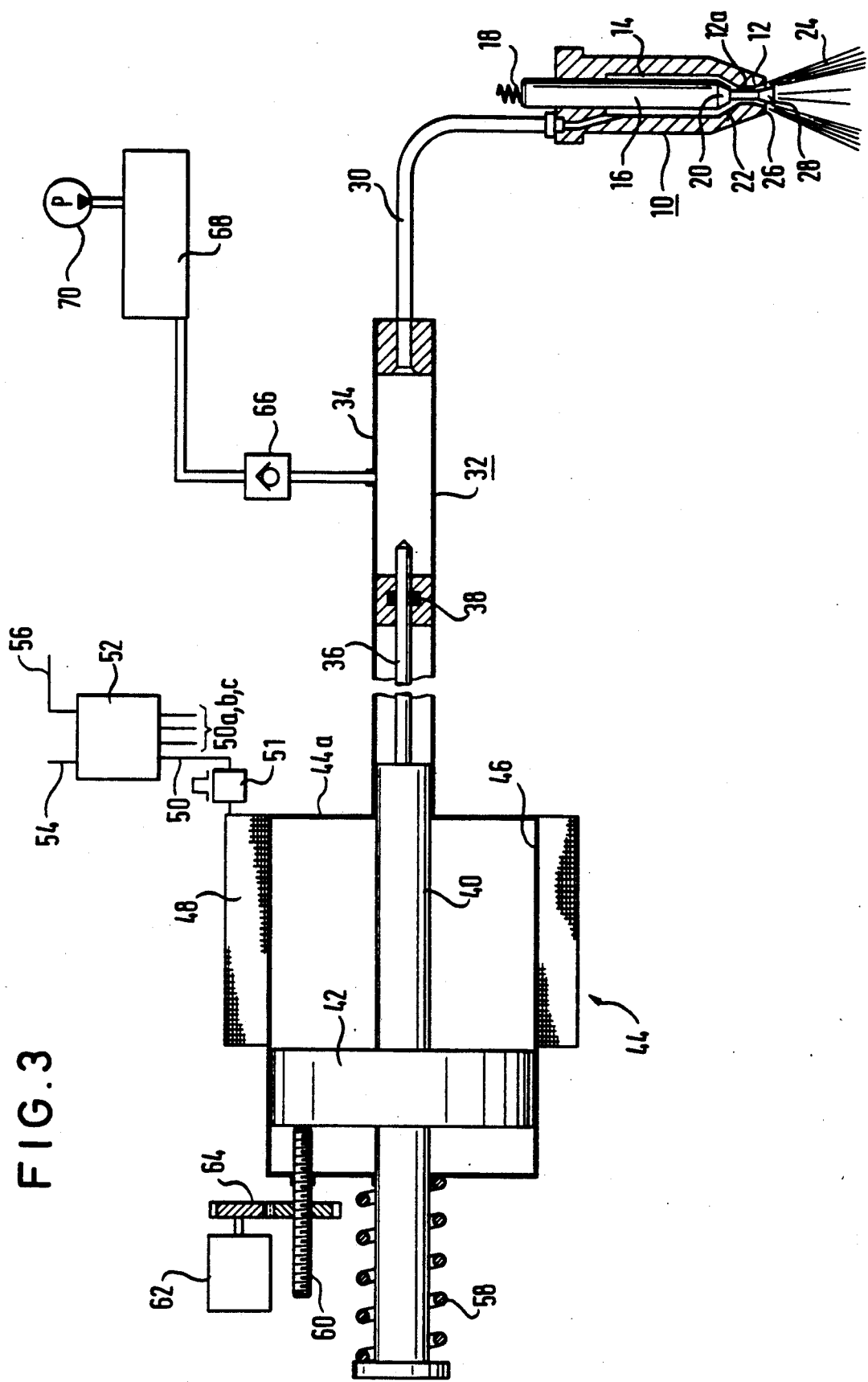

5,139,560

APPARATUS FOR THE MANUFACTURE OF HOLLOW GLASSWARE

This is a continuation of Ser. No. 601,631, filed Apr. 18, 1984, now U.S. Pat. No. 4,853,022.

SUMMARY

Hollow glassware is manufactured in mould cavities, which are formed basically of two half-moulds and of two orifice half-rings. During operation of the appliance it will be necessary to treat the mould surfaces of the half-moulds and the orifice half-ring contact surfaces, with which the orifice half-rings make contact with the half-moulds, with a lubricating and release agent. It is proposed that the treatment of the mould surfaces of the half-moulds on the one hand and the treatment of the orifice ring contact surfaces on the other hand is carried out by a single atomising jet for each mould cavity.

BACKGROUND OF THE INVENTION

The invention refers to an appliance for the manufacture of hollow glassware. In such appliances it is necessary to treat certain surfaces of the parts making up the mould with a lubricating and release agent. The appliances operate at an extremely elevated working speed, so that very short times only remain available for the treatment with lubricating and release agents. In addition, the accommodation facilities for any devices dispensing lubricating and release agents are very restricted.

THE STATE OF TECHNOLOGY

An appliance for the manufacture of hollow glassware is known from the European Publication of Patent of Invention 0 043 261. The resulting hollow glassware comprises an axis, a hollow glassware body and a hollow glassware neck. The appliance serving to manufacture such hollow glassware incorporates a mould cavity. This mould cavity incorporates an appropriate axis and an internal mould surface which comprises a first section, which corresponds to the hollow glassware body, and a second section, which corresponds to the hollow glassware neck. The first section of the internal mould surface is formed by two half-moulds, which meet in a basic position with one mould sectioning surface each in a mould sectioning plane, which also contains the axis of the mould cavity. The second section of the internal mould surface is formed by two orifice half-rings, which meet in a basic position with one orifice ring sectioning surface each in an orifice ring sectioning plane, which also contains the axis of the mould cavity. They also meet with one orifice ring connecting surface each, mould mating surfaces or the half-moulds in a mating plane, which is essentially perpendicular to the axis of the mould cavity. The two half-moulds define a charging orifice for a drop of glass at their opposite ends from the orifice half-rings. The charging orifice can be closed off by a closing body. A blow spike can be introduced in between the orifice half-rings for the purpose of blowing the glass into a hollow glassware. From their basic position, the half-moulds can be moved in an essentially perpendicular direction to the mould sectioning plane into an opening position. A gap will thus be formed in this manner between them, which will allow removal of the hollow glassware from the mould cavity. The orifice half-rings can be moved together with the hollow glassware from their basic position through the gap into a transfer section. There, they move essentially perpendicularly to the orifice half-ring sectioning plane away glassware over to a transfer device which will carry it during its subsequent processing. The orifice half-rings will then return into their basic position from the release location and the transfer location through the gap in between the half-moulds, which are in their open position. The half-moulds will also return into their basic position, after the orifice half-rings have returned into their own basic position. Atomising devices are provided to spray the internal surfaces of the mould and the mating faces of the orifice rings with a lubricating and release agent.

A total of three atomising jets are provided as atomising devices for each mould cavity. One atomising jet each is associated with each half-mould in such a manner that the mould surfaces of this half-mould can be irrigated when the particular half-mould is in the open position. A third atomising jet is provided to irrigate the orifice half-rings. It is a disadvantage of this form of implementation that three atomising jets are required for each mould cavity and that accordingly many high pressure conduits have to be installed under those already restricted conditions.

It is known from the U.S. Pat. No. 3,801,299 that a single atomising jet may be provided for both half-moulds, which will inject into the mould cavity when the mould-cavity is closed. However, no care is taken in this known style of execution for an adequate supply of the spraying and release agent to the orifice ring mating surfaces.

TASK OF THE INVENTION

It is a principal task of the invention to arrange and to operate the atomising device in an appliance for the manufacture of hollow glassware in such a manner that a lesser number of atomising jets will be adequate and that there will be correspondingly fewer conduits, while nevertheless ensuring an adequate supply to the surfaces of the mould and the mating surfaces of the orifice ring.

THE SOLUTION IN ACCORDANCE WITH THE INVENTION

The appliance is intended and suitable for the manufacture of hollow glassware which incorporate an axis, a hollow glassware trunk and a hollow glassware body.

The appliance for the manufacture of these hollow glasswares incorporates a mould cavity. This mould cavity incorporates an appropriate axis and an internal mould surface with a first section, which corresponds to the body (trunk) of the hollow glassware, as well as a second section, which corresponds to the neck of the hollow glassware. The first section of the internal mould surface is formed by two half-moulds, which meet, when in a basic position, with a mould sectioning surface each, in a mould sectioning plane which also contains the axis of the mould cavity. The second section of the internal mould surface is formed by two orifice half-rings, which meet in a basic position with one orifice ring sectioning surface each, in an orifice ring sectioning plane which also contains the axis of the mould cavity. They also meet with one orifice ring mating surface each, mould mating surfaces of the half-moulds in a mating plane, which is essentially perpendicular to the axis of the mould cavity. The two half-moulds define a charging orifice for a drop of glass at their opposite ends from the orifice half-rings. The charging orifice can be closed off by a closing body. A blow spike can be introduced in between the orifice half-rings for the purpose of blowing the glass drop into a hollow glassware. From their basic position, the half-moulds can be moved in an essentially perpendicular direction to the mould sectioning plane into an open position. A gap will be formed in this manner between them, which will allow removal of the hollow glassware from the mould cavity. The orifice half-rings can be moved together with the hollow glassware from their basic position through the gap into a transfer location. There, they move essentially perpendicularly to the orifice half-ring sectioning plane away from each other into a release position, to pass the hollow glassware over to a transfer device which will carry it during its subsequent processing. The orifice half-rings will then return into their basic position from the release location and the transfer location through the gap between the half-moulds, which are in their open position. The half-moulds will also return into their basic position after the orifice half-rings have returned into their own basic position. Atomising devices are provided to irrigate the internal surfaces of the mould and the meeting faces of the orifice rings with a lubricating and release agent. A single atomising jet is allocated as an atomising device to the mould cavity outside this latter in the vicinity of the axis of the mould cavity and at the side of the half-moulds facing the charging orifice. This atomising jet serves to irrigate at least a portion of the internal mould surface as well as to irrigate at least a portion of the orifice ring mating faces.

In accordance with a further development of the invention, the atomising jet is linked with a control device, which will trigger a first sequence of jet bursts through the atomising jet in all those instances when the half-moulds and the orifice half-rings are in their basic position, that is when the mould cavity is closed. On this occasion, the internal mould surfaces only will be irrigated and it is ensured on purpose that the mould separation faces of the half moulds and the orifice ring separation faces of the orifice half-rings are not covered with the lubricated and release agent. Then however the orifice ring mating surfaces will not be coated with the lubricated and release agent either, even if their irrigation is necessary. It is therefore proposed further that a second sequence of atomising bursts will be triggered by the control device when the orifice half-rings are about to assume their basic position but the half-moulds are still in their open position, so that essentially only the orifice ring mating surfaces are irrigated by the atomising bursts. In this implementation there is optimum control of the atomising agent dosage onto the internal mould surfaces of the mould cavity as well as onto the orifice ring mating surfaces of the orifice half-rings. Dosage can be adjusted individually, for example through ensuring that the atomising bursts of the first sequence occur at shorter mutual time intervals than the atomising bursts of the second sequence.

Another alternative consists in that the control device allocated to one of the atomising jets can be arranged in such a manner that one single sequence of atomising bursts is triggered in all cases when the orifice half-rings are in their basic position and the half-moulds are still not completely closed. It will be then possible to irrigate on the occasion of each atomising burst both the internal mould surface as well as at least a portion of orifice ring mating surfaces. Control is then admittedly simplified. It is however sometimes a disadvantage that there is a mutual interdependence between the dosage onto the internal mould surface and the dosing onto the orifice ring mating surfaces. This mutual interdependence can be reduced by the density distribution of the atomising stream, which can be influenced on the other hand by the shaped of the atomising jet and by the atomising pressure. In some cases however it will be necessary to fall back on the implementation form described earlier, in which two sequences of atomising bursts are generated.

Various other characteristics of the invention result from the sub-claims, which represent a part of the disclosure of the patent of invention.

For the purpose of an improved understanding of the invention, of its advantages and further characteristics of the invention as well as details for the use of the invention, reference is made to the drawings, which represent preferred forms of implementation of the invention.

BRIEF DESCRIPTION OF THE DRAWINGS

The following is shown in the drawings:

FIG. 1a shows in a side view the irrigation of the orifice ring halves while the halves of a preliminary mould are open;

FIG. 1e shows the formation of the blank in the closed preliminary mould;

FIG. 1g shows the injection into the partly opened preliminary mould;

FIG. 3 shows the schematic arrangement of the atomising head with piston/cylinder assembly and the operating installation for the piston/cylinder assembly.

DETAILED DESCRIPTION OF THE PREFERRED EMBODIMENTS

In FIG. 3 a atomising head is designated in quite general terms as (Item 10). This atomising head incorporates an atomising jet (Item 12). A control chamber (Item 14) is formed adjacent to the inner outlet (Item 12a) of the jet within the atomising head (Item 10). A plunger-like shaped jet closing piston (Item 16) enters this control chamber. It is guided to slide axially within the atomising head and it is pre-loaded by pre-loading device (Item 18) in a downward direction. A closing surface (Item 20) is formed at the lower end of the jet closing piston, which interacts with a seating surface (Item 22) of the atomising head (Item 10). When the pressure in the control chamber (Item 14) exceeds the amount prescribed by the pre-loading device (item 18), then the jet closing piston (Item 16) will be lifted in an upwards direction, so that the agent entering into the control chamber (Item 14) may emerge in the form of an atomised stream (Item 24) from the lower atomising jet orifice (Item 26). A jet needle (Item 28), which passes through the jet (Item 12) and is conically widened at the lower end, is linked with the jet closing piston (Item 16). The shape of the atomised stream can be varied by the shaped of the jet (Item 12) and of the jet needle (Item 28). In the present example, the drawing shows an atomised cone, the irrigation density of which is greater in the edge region than in the region of the axis.

The control chamber (Item 14) is connected through a high pre--sure conduit (Item 30) to a piston/cylinder assembly (Item 32). The piston/cylinder assembly consists of a cylinder (Item 34) and of a plunger piston (Item 36),which is introduced into cylinder (Item 34) through a seal (Item 38). The plunger piston (Item 36) is linked through a piston rod (Item 40) with a plunger armature (Item 42) of an electro-magnetic operating device (Item 44). The plunger armature (Item 42) is guided in solenoid (Item 48). The electric solenoid (Item 48) is connected through the wiring conductor (Item 50) to a control unit (Item 52), from which further wiring conductors (Item 50*a, b, c*) lead towards other atomising positions. The control unit (Item 52) is connected through a wiring conductor (Item 54) to an electric main supply and is further connected through a wiring conductor (Item 56) to the overall control of the hollow glassware manufacturing machine.

The plunger armature (Item 42) is pre-loaded by a helical compression spring (Item 58) into the left-hand end position as shown in FIG. 3. This left-hand end position is determined by an endstop (Item 60), which has been designed in the form of a threaded stud. The threaded stud (Item 60) can be adjusted through a servo-motor (Item 62) and a gearbox (Item 64).

The cylinder (Item 34) is connected through a non-return valve (Item 66) to a tank (Item 68), which contains the release or lubricating agent to be atomised. This agent is maintained under pre-compression by a pump (Item 70).

When the control unit (Item 52) receives an atomising command, then the solenoid (Item 48) is excited and the plunger armature (Item 42) is driven towards the right against the effect of the spring (Item 58). The plunger piston (Item 36) thus penetrates into the cylinder (Item 34) and displaces a portion of the agent contained therein, so that this will emerge from the jet (Item 12) in the form of an atomised stream (Item 24) while opening the jet closing piston (Item 16). The dosing amount is determined by the stroke of the piston and this in turn is determined by the stroke of the plunger armature. The stroke of the plunger armature is adjusted by the threaded stud (Item 60), while the right-hand end position of the plunger armature (Item 42) is determined by the stop against the wall (Item 44*a*). The solenoid (48) is supplied with direct current (d.c) pulses. The pulse height is responsible for the forward travel velocity and thus the duration of irrigation. The pulse length is adjusted in all cases in such a manner that the plunger piston (Item 36) reaches its right-hand end position. Thus the amount of agent determined by the setting of the threaded stud (Item 60) will be atomised in all cases. At the cessation of the corresponding current pulse, the plunger armature (Item 42) returns to the left-hand end position indicated in FIG. 3 and the plunger piston (Item 36) returns into the end position shown in FIG. 3. At the same time, the cylinder (Item 34) is replenished anew through the non-return valve (Item 66).

A pulse shaping device (Item 51) which will enable change of pulse length is inserted in the wiring conductor (Item 50). This will provide a further means of changing the dosing at each atomising burst. It can be imagined that the threaded stud (Item 60) and the associated components (Items 62 and 64) were to be dispensed with. Under the influence of the helical compression spring (Item 58), the plunger armature (Item 42) will then assume its left-hand end position and will then be pulled towards the right for a lesser or greater distance, depending on the pulse duration which has been set in the pulse shaping device (Item 51). The pulse shaping device (Item 51) can be adjusted from a central control desk.

FIG. 1*a* shows schematically a preliminary mould (Item 72), which consist of two preliminary half-moulds (Items 72*a* and 72*b*). The preliminary half-moulds are opened up, that is they have moved away from each other perpendicularly to the drawing plane of FIG. 1*a*. An orifice ring (Item 74) which consists of two orifice ring halves (Item 74*a* and 75*b*) is located at the lower end of the preliminary mould (Item 72). This orifice ring serves to form the neck of the hollow glassware (bottle) which is in the process of being generated. As can be seen from the associated FIG. 2*a*, the orifice ring components (Items 74*a* and 74*b*) are closed in the position shown in FIGS. 1*a* and 2*a*, while the preliminary mould halves (Items 72*a* and 72*b*) are still open. The location of the atomising head (Item 10) can be obtained from inspection of FIG. 1*a*. The atomising head is located in the immediate vicinity of the end (Item 76*a*) of a glass feeder trough (Item 76), the significance of which will be considered later on. When the halves (Items 72*a* and 72*b*) of the preliminary mould are open, then the orifice ring mating surfaces (Items 74*aa* and 74*ba*), pointing upwards, are exposed to an atomising stream (Item 24). This atomising stream also impinges upon a blow spike (Item 78), which is retained in the center of the orifice ring (Item 74) and the significance of which is yet to be considered below. The atomised stream (Item 24) does not impinge upon the mould separation surfaces (Item 72*c* and 72*d*), which is desirable. It also does not impinge upon the orifice ring separation surfaces (Items 74*c* and 74*d*), which is desirable. But it also does not impinge upon the mould surfaces (Items 72*e* and 72*f*), which do require to be irrigated with a lubricating and release agent.

After the atomised stream (Item 24) has stopped, the preliminary mould (Item 72) is closed as shown in FIG. 1*b*, by moving the preliminary mould halves (Items 72*a* and 72*b*) together perpendicularly to the plane of the drawing. A drip ring (Item 80) is placed on top of the preliminary mould (Item 80) the significance of which is yet to be discussed below. It will be noted that an atomised stream (Item 24) may now enter from the atomising head (Item 10) into the hollow mould (Item 72), which will wet the mould surfaces (Items 72*e* and 72*f*) of the preliminary mould with the lubricating or release agent. FIG. 1*b* shows the height h of the atomising head (Item 10) above the preliminary mould (Item 72), which, in this example, is in the vicinity of approx 600 mm.

It must be noted further that the injection of the atomised stream (Item 24) need not take place each time when reaching the position in accordance with FIGS. 1*a* and 2*a*. It will be, rather, sufficient of an atomised stream (Item 24) is generated at periodic intervals. Neither need the atomised stream (Item 24') be switched on every time the condition in accordance with FIG. 1b has been reached. For example it may be possible to trigger the atomised stream in accordance with FIG. 1b after every fifth forming process, while it will be sufficient to trigger the atomised stream in accordance with FIGS. 1a and 2a after every tenth up to every thirtieth forming process.

Figure 1B:
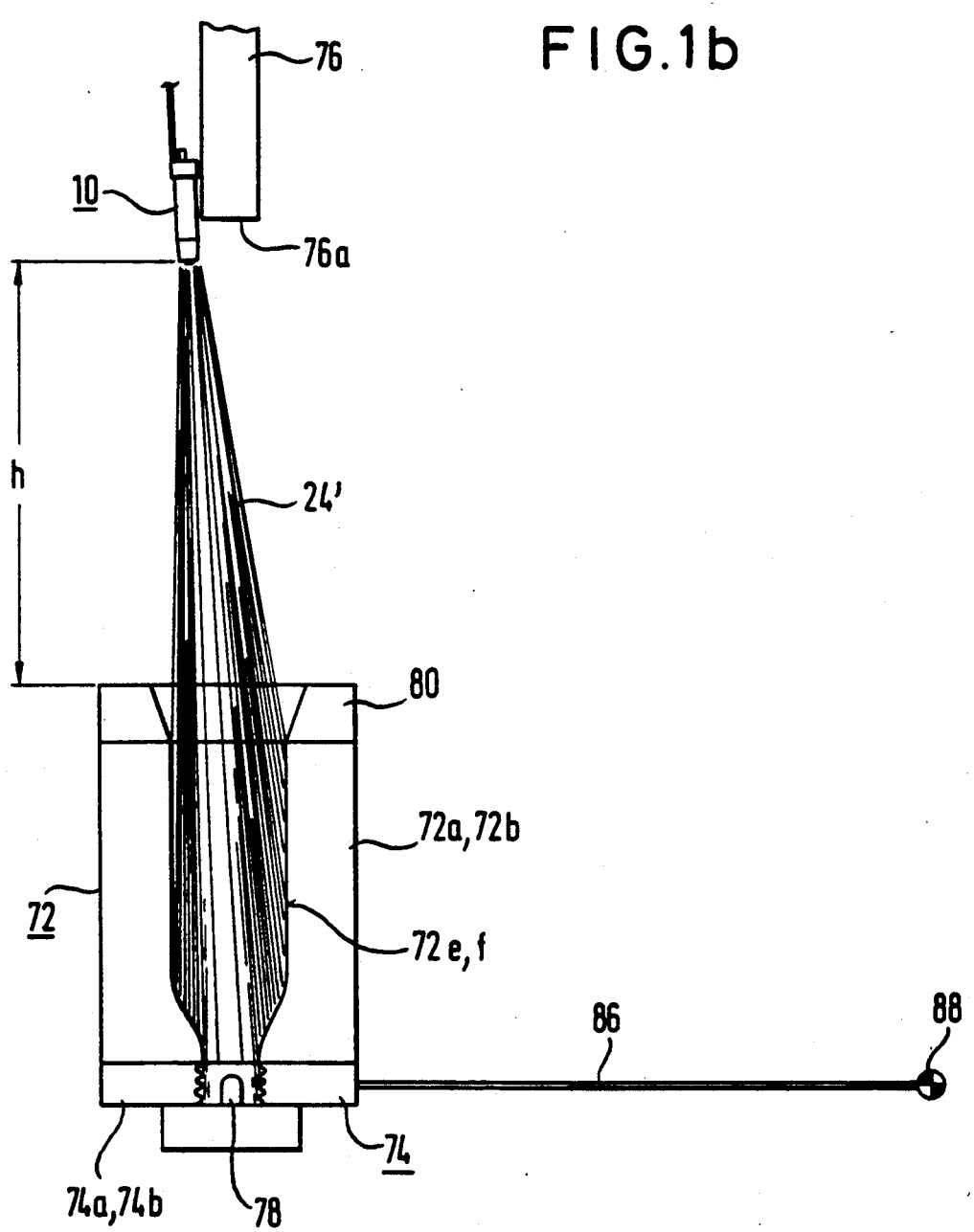
FIG. 1b shows the injection into the closed preliminary mould.
Figure 1C:
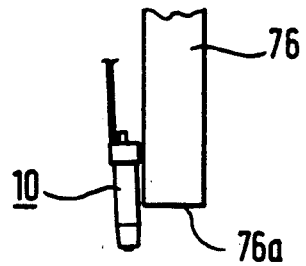
FIG. 1c shows the entry of the drop of glass into the closed preliminary mould.
Figure 1C:
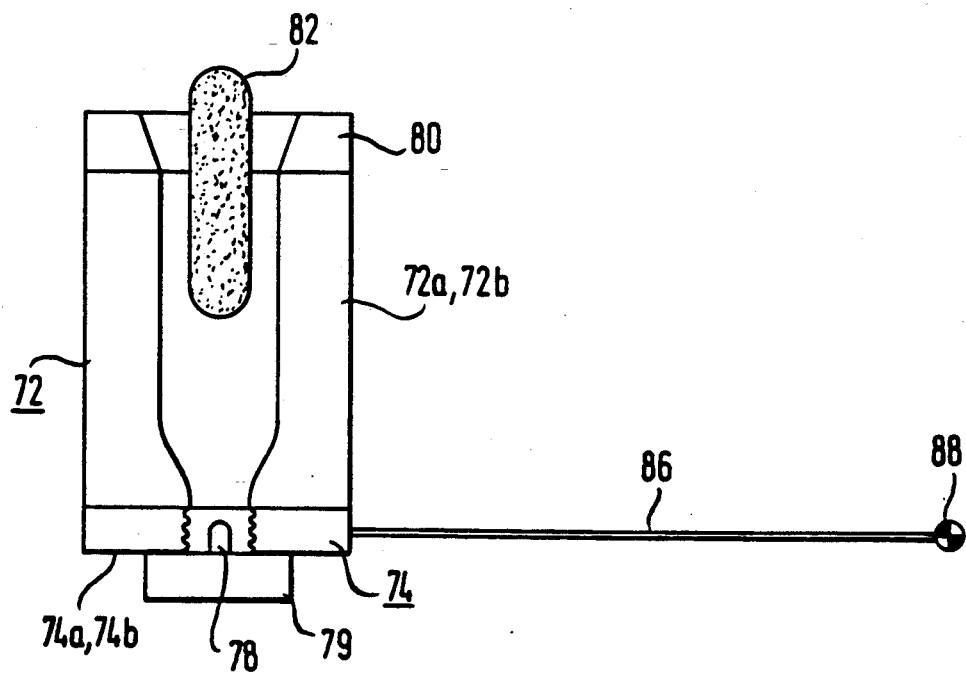

It can be seen in FIG. 1c, that a drop of glass (Item 82) has entered the closed preliminary mould (Item 72) from the glass feeder trough (Item 76) through the drip ring (Item 80). In accordance with FIG. 1d, the drop (Item 82) has settled in the closed preliminary mould (Item 72), possibly under the influence of settling air, which has been injected from above through a preliminary mould bottom cylinder (Item 84).

In accordance with FIG. 1e, the drip ring (Item 80) has been removed and the preliminary mould bottom cylinder (Item 84) placed directly onto the preliminary mould (Item 72) and the mould cavity of the preliminary mould (Item 72) is now closed off tightly in the upwards direction. The settled drop (Item 82') will now be deformed into a blank (Item 82'') through the blow spike. The preliminary mould (Item 72) will open up after cooling of the blank (Item 82''), through transferring the halves (Items 72a and 72b) of the preliminary mould into the position shown in FIG. 2a. The preliminary mould bottom cylinder (Item 84) is removed. The solidified blank is then held only by means of the orifice ring 74 and can be pivoted by the swivel arm (Item 86) around the pivot (Item 88). The pivoting action can be seen in FIG. 1f. In FIG. 1f, the blank (Item 82''), held by the orifice ring, assumes an intermediate position, while the position of the blank (Item 82'') after its entry into a final mould is shown in broken lines. While the further deformation of the blank (Item 82'') takes place inside the final mould (Item 90), the orifice ring (Item 74) returns into the position of FIGS. 1a and 2a, when it can close during the return path, so that the atomised stream (Item 24) may be started immediately upon reaching the condition shown in FIG. 2a.

It should be noted that the final mould (Item 90) may be irrigated in a similar manner with lubricating and release agent.

In summarizing, the working process during the manufacture of a bottle can be represented as follows:

In accordance with FIG. 1c, an enclosed mould cavity is formed by the preliminary mould halves (Items 72a and 72b), the orifice ring halves (Items 74a and 74b) and the blow spike (Item 78) as well as by the associated blow spike carrier (Item 79). A glass drop (Item 82), which is dispensed from the end (Item 76a) of the glass feeder trough (Item 76) falls through the drip ring (Item 80) into the cavity of the mould.

Figure 1D:
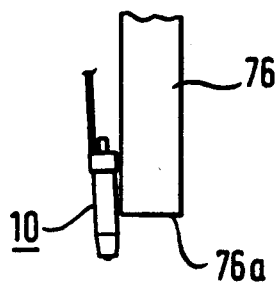
FIG. 1d shows the settling of the drop of glass in the closed preliminary mould.
Figure 1D:
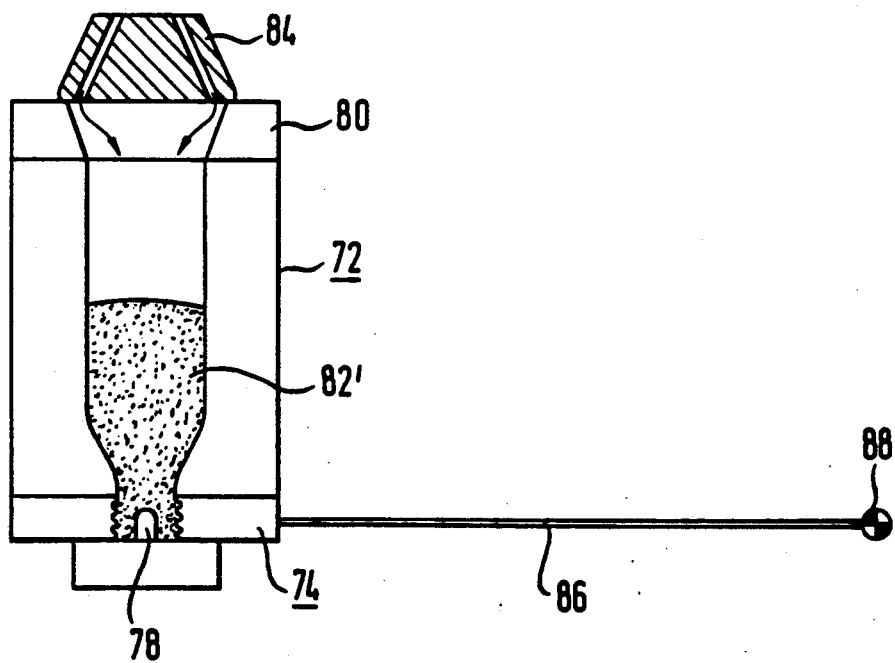
Figure 1F:
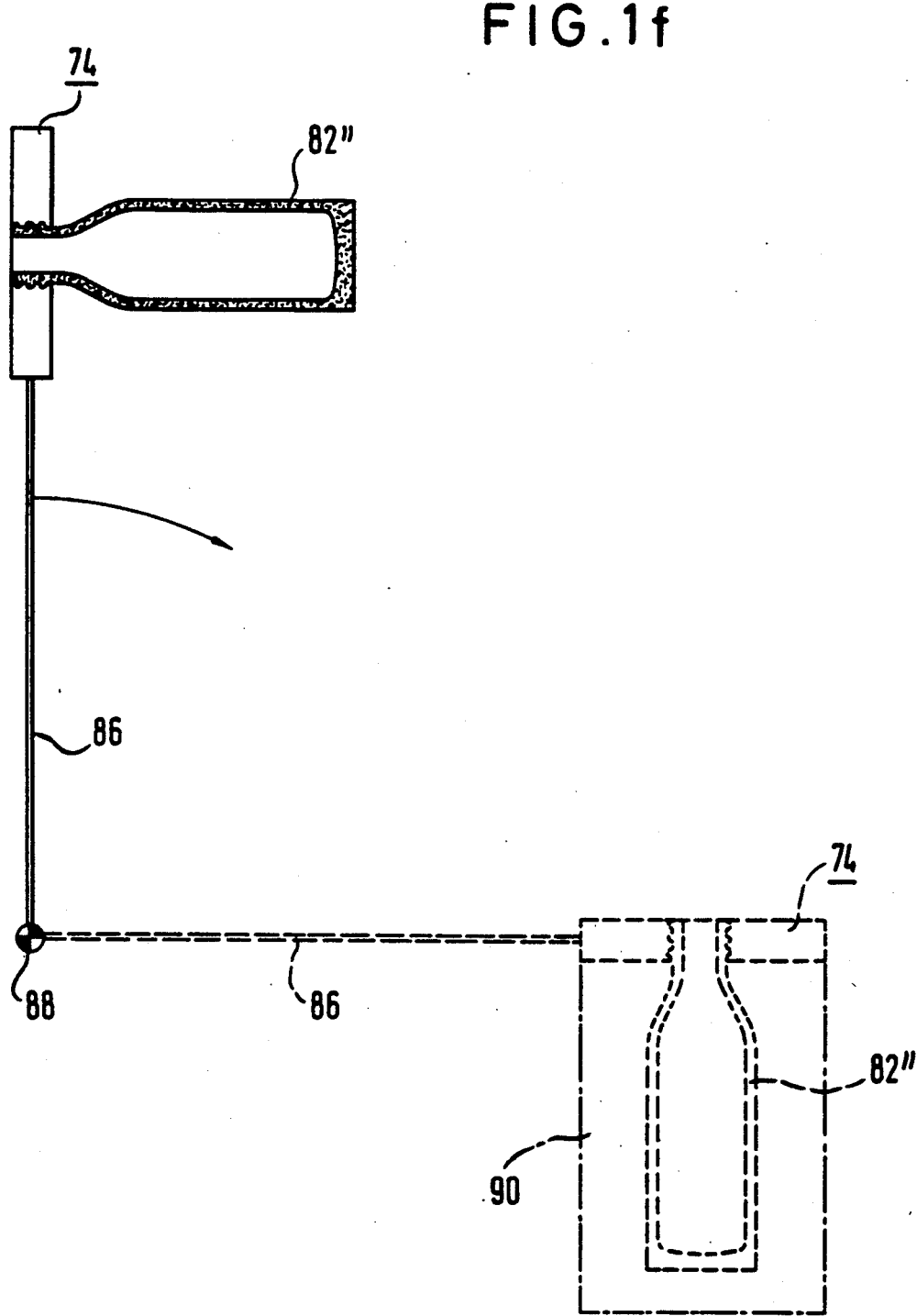
FIG. 1f shows the transfer of the blank from the opened preliminary mould into a final mould.

In accordance with FIG. 1d, the preliminary mould bottom cylinder (Item 84) is placed onto the upper end of the drip ring (Item 80) and setting air is injected under pressure into the mould cavity, so that the glass drop will collect in the lower part of the mould cavity. In accordance with FIG. 1e, the preliminary mould bottom cylinder (Item 84) is placed directly onto the upper end of the preliminary mould halves after removal of the drip ring (Item 80), so that the mould cavity is closed off in an upwards direction. Air can now be injected through the blow spike (Item 78) into the liquid mass of glass, when the blank (Item 82'') will be produced. The blank cools off rapidly and reaches a consistency which will allow the preliminary mould halves (Items 72a and 72b) to be opened. The blank (Item 82'') is then carried only by the orifice ring halves (Items 74a and 74b).

In accordance with FIG. 1f, the orifice ring (Item 74) with the blank (Item 82'') has been withdrawn from the opened preliminary mould (Item 72) and it is on its way towards the final mould (Item 90). As soon as the blank (Item 82'') has been accepted by the final mould (Item 90), which can be constructed similarly to the preliminary mould (Item 72), the orifice ring (Item 74) will open up, in that the orifice ring halves will briefly lift off from each other. The orifice ring (Item 74) now starts on its return path, when the orifice ring halves have closed again prior to reaching the position shown in FIG. 1f in unbroken lines. The orifice ring (Item 74) returns to its basic position in accordance with FIG. 1a through the gap formed between the still mutually separated preliminary mould halves (Items 72a and 72b). As soon then as the orifice ring (Item 74) has reached its basic position in accordance with FIG. 1a and before closing of the preliminary mould (Item 72) begins or during the starting phase of this closing motion, the atomised stream (Item 24) is ejected by the spray head (Item 10) so that the orifice ring mating surfaces (Items 74a and 74b) will be irrigated. The atomised stream (Item 24) may here have a different density distribution in a cross section perpendicular to its axis. The distribution of the atomised agent within the atomising stream may be adjusted depending on the lubricating and release agent requirements on the individual surfaces. Irrigation of the orifice ring mating surfaces (Items 74aa and 74ba) takes place in the example shown after every thirtieth moulding process.

As soon as the preliminary mould halves (Items 72a and 72b) have closed in accordance with FIG. 1b, a further atomised stream (Item 24') takes place, which will then irrigate with a lubricating and release agent the internal surfaces of the mould on the inside of the mould halves (Items 72a and 72b) and on the inside of the orifice ring halves (Items 74a and 74b). These irrigation processes take place in the example shown after ever fifth moulding process.

The next moulding process then starts in accordance with FIG. 1c.

In the example shown, the atomising head (Item 10) is arranged to be stationary. It can be imagined, however, that the atomising head (Item 10) be arranged in a mobile manner, so that it can be adjusted, under the control and as a function of the machine rhythm, between an atomising position and a retracted position.

In each case, the atomising head (Item 10) can be located at a large distance of for example 500 to 800 mm from the preliminary mould and from the orifice ring, when the atomising process takes place without any carrier air and if the pressures used are between 100 to 1000, preferably between 300 to 700 bars.

The lubricating and release agents are built up for example on the basis of mineral oil and graphite and they have a viscosity $\eta$ of approx. 50 to 3000 cp at room temperature. These highly viscous lubricating and release agents can be dispensed relatively inaccurately only onto individual irrigation points using conventional equipment. It is therefore significant that a separate piston/cylinder assembly is associated with each individual atomising head in accordance with FIG. 3.

With respect to the time sequence it will be necessary to consider that modern hollow glassware manufacturing machines will generate a hollow glassware from each mould cavity every 6 seconds. The rhythm time goes down as low as 4 seconds. It arises from this that while taking all other necessary processes into consideration, an extremely short time only, with an order of magnitude of 100 to 150 milliseconds at the most, remains available for the atomised injection processes.

It is necessary to note in addition that it is possible in principle to associate several piston/cylinder assemblies (Item 32) with a common drive (Item 44). On the other hand it is however also possible to individualize the power supply to the drives (Item 44) associated with the individual atomising locations to such an extent that different operating times and driving forces can be set for the individual atomising locations.

When using the pulse shaping device (Item 51) it is also possible to remotely control this latter, so that it is possible to individually adjust from a central control unit the dosage for the individual atomising locations of individual moulds. In this manner it is also possible to take into account the condition of individual moulds, for example that the irrigating requirements of a recently installed mould are different from that of a mould which had been in use for some time already.

Figure 2A:
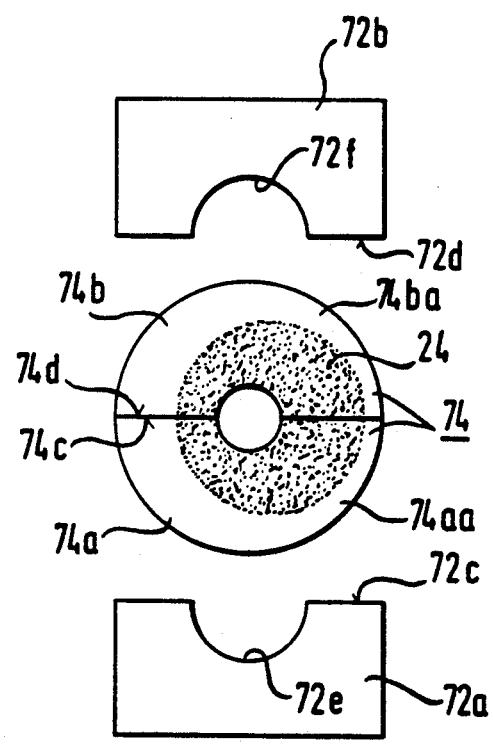
FIG. 2a shows the view from above onto the closed orifice halve-rings while the preliminary mould halves are open, indicating also the impact pattern of the impinging atomised stream.
Figure 2B:
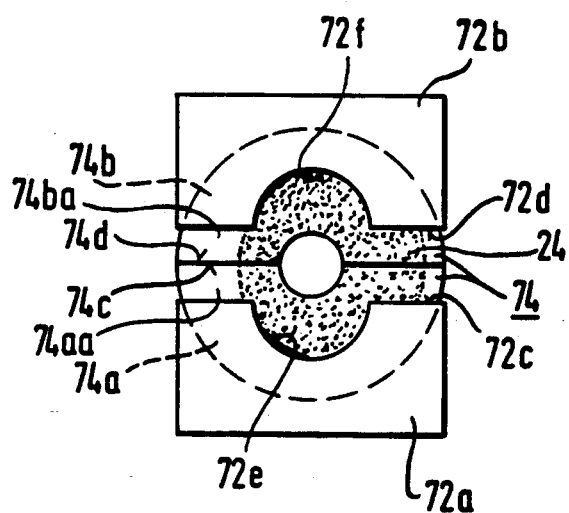
FIG. 2b shows a view from above onto the closed orifice ring while the preliminary half-moulds are partly opened, together with the impact pattern of the impinging jet stream onto the orifice half-rings.

FIGS. 1g and 2b show an operating mode, which differs from the operating mode described so far. In this operating mode (and this can be seen in particular from FIG. 2b), the atomising burst (Item 24) is generated when the preliminary halves (Items 72a and 72b) have already partly moved together again, so that the internal mould surface (Items 72e and 72f) are being irrigated at the same time as the orifice ring mating surfaces (Items 74aa and 74ba). This implementation form will allow only one single sequence of atomising burst, which will provide for example an atomising burst each after every 5 moulding processes.

In contrast with the representation shown in FIG. 2a it is also possible to shape the atomising stream (Item 24 or 24') in such a manner that an approximately centered impact pattern is achieved at the impact location in the case of an inclined and/or axially displaced atomising head, for example by way of a special construction of the atomising jet (Item 12) and/or of the jet needle (Item 28) with respect to a curved atomising stream.

A non-return valve may be provided in the pipeline (Item 30) of FIG. 3 at the outlet from cylinder (Item 34) which closes in the direction of cylinder (Item 34). This will maintain a once generated pressure in the pipeline (Item 30) during the return travel of the piston (Item 36), so that the influence of the pipeline elasticity on the dosing can be kept at a low level.

We claim:

1. A spray apparatus in combination with a hollow glass body forming machine for spraying a lubricant or a spraying agent, said hollow glass body forming machine comprising at least one mold (72) having an axis, said at least one mold (72) comprising two mold halves (72a, 72b), said mold halves (72a, 72b) defining an internal circumferential face (72') of a mold cavity, and a filling aperture for filling a glass blob (82) into said mold cavity, said mold halves (72a, 72b) being movable with respect to each other in a direction substantially transverse to said axis between a mutually approached position corresponding to a closed condition of the mold and a mutually separated position, said hollow glass body forming machine further comprising a mouth ring (74a, 74b) axially remote from said aperture, said mouth ring (74a, 74b), in said closed condition of the mold, being in contact with an axially directed end face of the mold (72) by a mouth ring connecting face (74aa, 74ba), said spray apparatus having nozzle means (12) located close to the axis of said mold on the axial side of said mold remote from said mouth ring (74a, 74b), said nozzle means (12) being aimed so as to spray substantially along said axis through said filling aperture into the mold cavity and, when the mold halves (72a, 72b) are separated from each other, also onto the mouth ring connecting face (74aa, 74ba), said hollow glass body forming machine further comprising a glass feed channel (76) having an exit aligned with said filling aperture, said nozzle means comprising a nozzle (12) operated in a rhythm of said hollow glass body forming machine so as to eject spray jets (24', 24) which impinge said internal circumferential face (72') and also impinge, when said mold halves (72a, 72b) are separated from each other, said mouth ring connecting face (74aa, 74ba), said nozzle (12) being supplied by a piston cylinder assembly (32) with the lubricant or spraying agent, said piston cylinder assembly (32) being driven in the operating rhythm of the hollow glass body forming machine, said nozzle (12) being provided with a nozzle occluding piston (16) which is subject to pressure generated within said piston cylinder assembly (32) and is displaceable from a nozzle occluding position to a nozzle opening position by said pressure when said pressure arrives at a predetermined value.

2. A device for producing hollow glass bodies which comprise an axis, a trunk portion and a neck, the device comprising a molding cavity having an axis and an inner molding surface with a first portion corresponding to the trunk of the hollow glass body and a second portion corresponding to the neck of the hollow glass body, the first portion of the inner molding surface being formed by two mold halves (72a, 72b) which in a basic position have abutting mold separating surfaces (72c, 72d) disposed in a mold separating plane which contains the axis of the molding cavity, the second portion of the inner molding surface furthermore being formed by two mouth ring halves (74a, 74) which in a basic position abut with a mouth ring separating surface (74c, 74d) in a mouth ring separating plane which contains the axis of the molding cavity, each mouth ring half having a mouth ring connecting face (74aa, 74ba) bearing in the basic position on mold connecting faces of the mold halves (72a, 72b) in a plane of connection which is substantially perpendicular to the axis of the mold cavity, the two mold halves (72a, 72b) defining at their ends which are remote from the mouth ring halves (74a, 74b) a filling aperture for a glass blob (82), the device further comprising an occluding member (84) for the filling aperture, a glass body cavitating member (78) provided so as to be insertable between the mouth ring halves (74a, 74b), the mold halves (72a, 72b) being movable out of their basic position at substantially a right angle to the mold separating plane, away from each other into an opening position in order to form between them a gap so that the relevant hollow glass body (82") can be removed through said gap from the mold cavity, the mouth ring halves (74a, 74b) being movable together with the relevant hollow glass body (82") out of their basic position, through the gap, to a transfer location in which they are movable away from each other substantially at a right angle to the plane of separation of the mouth rings and into a detachment position so that the hollow glass body (82") can be passed over to receiving means (90), the mouth ring halves (74a, 74b) being returnable from the detachment position and the transfer location through the gap in the mold halves (72a, 72b)

which are in the open position and back into their basic position, the mold halves (72a, 72b), after return of the mouth ring halves (74a, 74b) being likewise adapted to be returned to their basic position, nozzle equipped spray means (10, 12) furthermore being provided in order to spray the inner molding surface with a lubricant and separating agent, said nozzle equipped spray means (10, 12) being associated with the mold cavity so as to have a respective nozzle (12) on the outside of the mold cavity, close to the axis of the mold and on the side of the mold halves (72a, 72b) which is toward the filling aperture, said nozzle equipped spray means (10, 12) serving both for spraying at least a part (72e, 72f) of the inner molding surface and also for spraying at least a part of the mouth ring connecting faces (74aa, 74ba), the nozzle equipped spray means (10, 12) being connected to a control device (52) which provides one of two different control functions, namely a first control function which triggers a first series of spray pulses (24') by the nozzle equipped spray means (10, 12) when the mold halves (72a, 72b) and the mouth ring halves (74a, 74b) are in their basic position, when the mold cavity is closed, so that essentially only the inner molding surface is sprayed, and a second series of spray pulses (24) when the mouth ring halves (74a, 74b) assume their basic position but the mold halves (72a, 72b) are still in their open positions so that it is substantially only the mouth ring connecting faces (74aa, 74ba) which are subject to the spraying pulses (24), and a second control function which triggers a single series of spray pulses (24) when the mouth ring halves (74a, 74b) are in their basic position and the mold halves (72a, 72b) are still not completely closed, so that at each spray pulse, both at least part of the inner molding surface and also at least a part of the mouth ring connecting faces (74aa, 74ba) are sprayed.

3. A device according to claim 2, wherein the nozzle part equipped spray means (10, 12) is disposed in a stationary manner at a location so as to not impede transfer of the mouth ring valves (74a, 74b) which happen to be carrying the hollow glass body (82'') out of their basic position to the transfer location.

4. A device according to claim 2, and further comprising a glass feed channel (76) having an end (76e) aligned with said filling aperture, the nozzle equipped spray means (10, 12) has the respective nozzle (12) disposed in the vicinity of the end (76a) of the glass feed channel (76).

5. A device according to claim 2, wherein the control device (52) provides the control functions so that the spray pulses (24') of the first series follow one another at shorter intervals of time than the spray pulses (24) of the second series.

6. A device according to claim 2, wherein the control device (52) is adapted for time adjustment of the spray pulses (24, 24') in relation to the operation of the device.

7. A device according to claim 2, wherein the control device (52) is adapted for spray frequency adjustment.

8. A device according to claim 2, wherein the control device (52) is configured for adjustment of the quantity of lubricant and separating agent per spray pulse.

9. A device according to claim 2, wherein the nozzle equipped spray means (10, 12) includes a single substance nozzle (12) which operates without any addition of pressurized gas.

10. A device according to claim 2, wherein said nozzle (12) is adjustable between a working position and a retracted position.

11. A device according to claim 2, wherein the nozzle (12) has a cone shape.

12. A device according to claim 11, wherein the cone shape of the nozzle (12) and the axial distance of the nozzle (12) from the mold cavity are provided so as to provide a spray cone sufficient to meet both at least part of the inner mold face and at least part of the mouth ring connecting faces (74aa, 74ba).

13. A device according to claim 2, wherein the nozzle equipped spray means (10, 12) is connected to a pressure generator in the form of a piston-cylinder assembly (32) which supplies only said respective nozzle (12).

14. A device according to claim 13, wherein the control device (52) includes a plurality of exit conductors (50, 50a, 50b, 50c) connectable to electromagnetic drives (44) of a plurality of piston-cylinder assemblies (32).

15. A device according to claim 13, wherein the piston cylinder assembly (32) is constructed so as to provide pressures of 100 to 1,000 bars.

16. A device according to claim 15, wherein the piston cylinder assembly (32) is constructed so as to provide pressures of 300 to 700 bars.

17. A device according to claim 13, wherein the nozzle equipped spray means (10, 12) includes a spray head (10), a nozzle occluding piston (16) which is subject to a pretension and is associated with said respective nozzle (12), this nozzle occluding piston (16) being movable into an open position by the application of a spray pressure applied by the piston cylinder assembly (32).

18. A device according to claim 17, wherein the spray head (10) includes, in advance of the nozzle (12), a control chamber (14) which accommodates a part of the nozzle occluding piston (16) which is guided for displacement in the spray head (10), the nozzle occluding piston (16) including an occluding face (20) opposite a seating face (22) of the control chamber (14), the total cross-section of the nozzle occluding piston (16) being greater than its partial cross-section which is masked by the seating face (22).

19. A device according to claim 18, wherein the nozzle occluding piston (16) carries a spray jet influencing needle (28) which penetrates the nozzle (12).

20. A device according to claim 18, wherein the piston-cylinder assembly (32) includes a cylinder (34) connected by an intake valve 66, which is a non-return valve, to a lubricating or separating agent tank, this cylinder being connectable to the control chamber (14) of the spray head (10) without any other valves being incorporated.

21. A device according to claim 13, wherein a piston (36) of the piston-cylinder assembly (32) is adjustable by an electromagnetic drive (44).

22. A device according to claim 21, wherein the piston (36) is pretensioned by spring means (58) toward a first extreme position in which it is retracted from a cylinder (34) of the piston-cylinder assembly (32) and is displaceable into another extreme position within the cylinder (34) by said electromagnetic drive (44).

23. A device according to claim 21, wherein the electromagnetic drive (44) is a direct current operated plunger armature drive.

24. A device according to claim 21, wherein the electromagnetic drive (44) is connected to said control device (52) through a pulse shaping device (51) adapted to provide energizing pulses of variable length.

* * * * *